INVENTOR.
MILTON E. CHANDLER
BY Lester W Clark
AGENT

Patented Jan. 15, 1946

2,393,144

UNITED STATES PATENT OFFICE 2,393,144

CARBURETOR

Milton E. Chandler, New Britain, Conn., assignor to Chandler-Evans Corporation, South Meriden, Conn., a corporation of Delaware Application June 10, 1943, Serial No. 490,281

4 Claims. (Cl. 261—39)

This invention relates to fluid flow measurement, and particularly to the measurement of the flow of a fluid subject to variations in density. This invention is particularly useful in connection with the measurement of the quantity of air flowing through a carburetor in an internal combustion engine adapted for use on aircraft.

In internal combustion engines, the most efficient conditions for combustion are obtained when the mass of fuel supplied to the engine is properly proportioned with respect to the mass of air supplied. In order to obtain such combustion conditions, it has been proposed to measure the quantity of air flowing through the carburetor and to operate a valve controlling the fuel flow in accordance with the quantity measured. It has been found that with such devices, the measurement of the air is subject to error because of variations in the density in the air, so that the quantity of fuel is not properly proportioned at all times.

It is, therefore, an object of this invention to provide improved means for measuring the flow of a fluid subject to variations in density.

Another object of the present invention is to provide an improved carburetor for use on aircraft, in which means is provided for measuring the mass of the air flowing through the carburetor.

Another object of the present invention is to provide improved fluid flow measuring means of the venturi meter type, in which means is provided for correcting errors inherent in the Venturi meter.

A further object of the invention is to provide improved means for measuring the flow off fluid through a conduit, including a Venturi tube in the conduit, a passage connecting the throat of the Venturi tube with a point in the conduit spaced from the venturi, means for restricting the flow of fluid through the passage so as to correct for inaccuracies of the venturi, and means for measuring a differential pressure in said passage.

Figure 1:
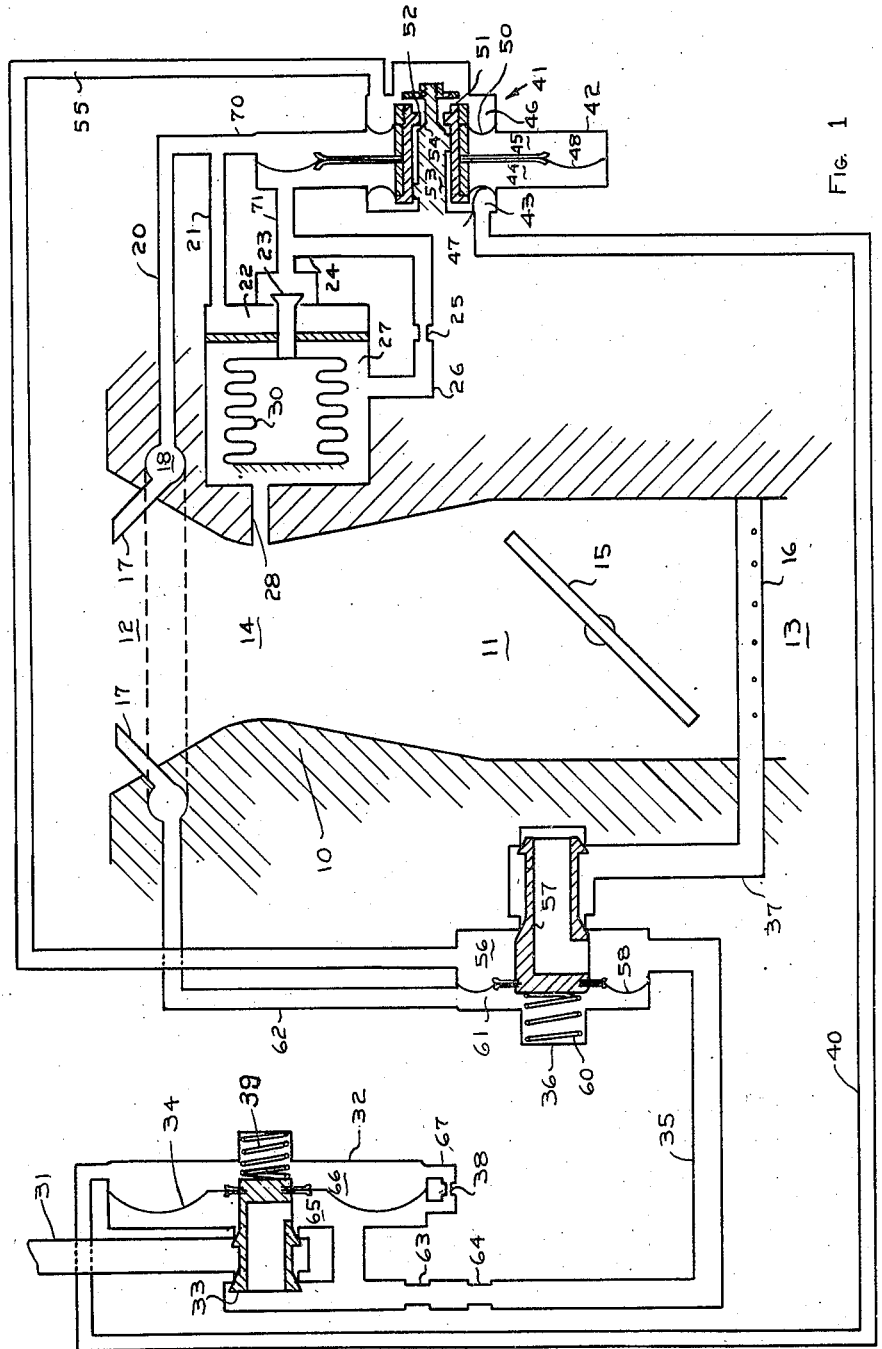
Figure 2:
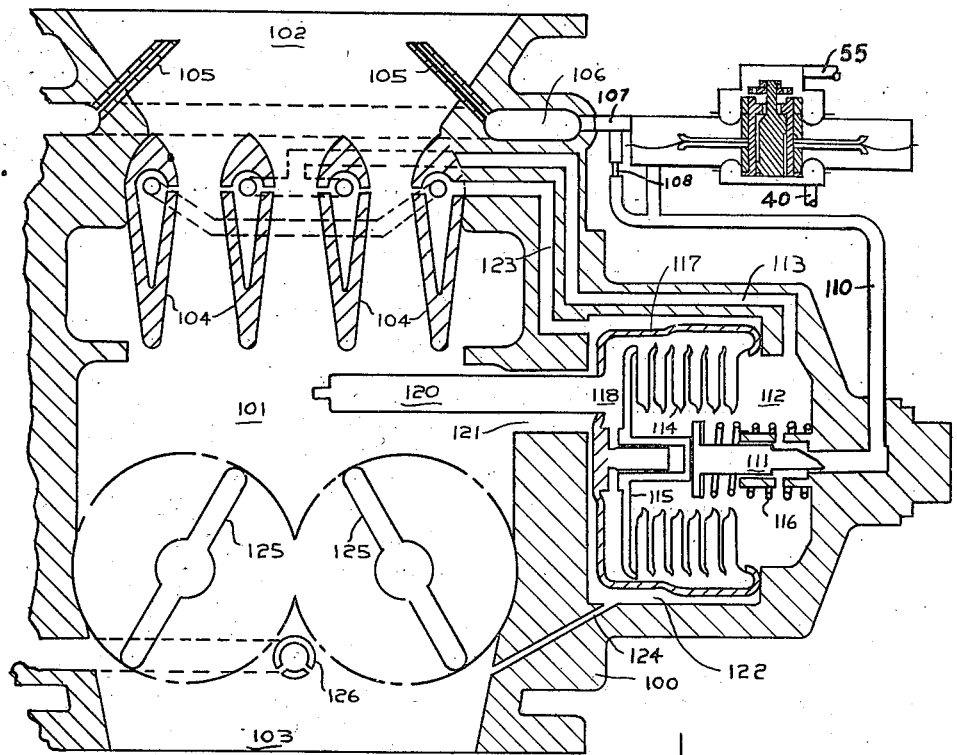
Figure 3:
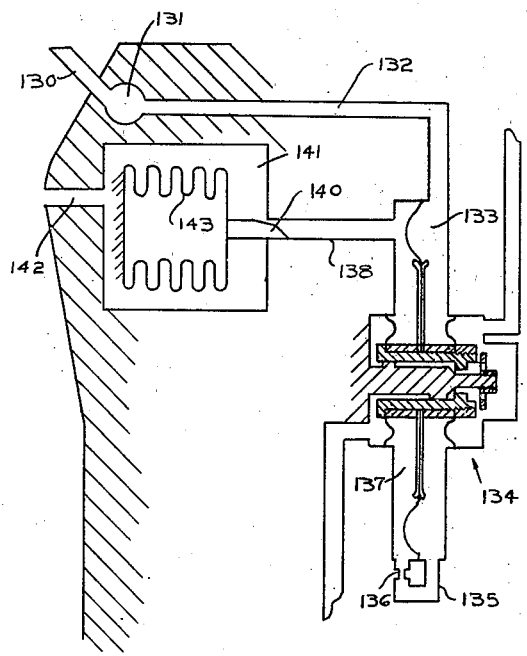
Figure 4:
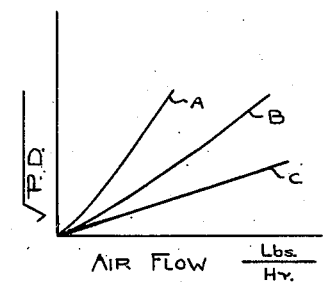

Other objects and advantages of the present invention will become apparent from a consideration of the appended specification, claims, and drawings, in which:

Figure 1 is a somewhat diagrammatic illustration of a carburetor for an internal combustion engine embodying the principles of my invention, Figure 2 is a cross-sectional view of a portion of a modified form of carburetor built in accordance with my invention, Figure 3 is a diagrammatic illustration of another modified form of carburetor utilizing the principles of my invention, and Figure 4 is a graphical illustration of the functional relationships between the air flow and the differential pressures existing between certain points in a carburetor built in accordance with my invention.

Referring now to Figure 1, there is shown a carburetor body portion 10, having an air passage extending therethrough from an inlet 12 to an outlet 13. The air passing through the carburetor enters the inlet 12, and then flows past a venturi 14, a throttle 15, and a fuel discharge nozzle 16.

A number of impact tubes 17 is located at the inlet 12. The open ends of the tubes 17 are exposed to the air entering the inlet 12. The tubes 17 are all connected to a passage 18, commonly termed a vent ring. The impact tubes 17 and the vent ring 18 form a part of a passage connecting the inlet 12 with the throat of the venturi 14. This passage may be traced from the inlet 12 thru the impact tubes 17, vent ring 18, a conduit 20, a conduit 21, a valve chamber 22, past a valve 23, through a conduit 24, a restriction 25, a conduit 26, a chamber 27, and a conduit 28 to the throat of venturi 14.

The valve 23 is operated by a flexible bellows 30, which is mounted in the chamber 27, and is therefore exposed, through the conduit 28, to the pressure existing at the throat of venturi 14. The left end of the bellows 30, as it apears in the drawings, is fixed, and the valve 23 is attached to the right end of the bellows. The valve 23 is so constructed that as the bellows expands upon a drop in pressure in the chamber 27, the valve is moved to open wider.

There is shown in Figure 4 a set of curves illustrating the relationship between air flow through a Venturi tube such as that shown at 14 and the square root of the pressure differential existing between the throat of the tube and a point in the passage 11 spaced from the tube. The curves marked A and B in Figure 4 represent two curves made with different pressures at the inlet 12. The curve A was made with a lower value of inlet pressure, and hence lower density, than the curve B. The effect of a variation in density on the relationship between air flow and differential pressure may be observed by comparing curves A and B.

The straight line C in Figure 4 represents the relationship between air flow and the square root of the pressure difference which would be most desirable for purposes of measuring the air flow and controlling the fuel flow from that measurement.

Since the ordinates in Figure 4 are measured in terms of the square root of a pressure difference, it will be understood that the straight line C represents a pressure difference which varies as a parabolic function of the air flowing through the carburetor. The curves at A and B illustrate pressure differentials which vary as exponential, but non-parabolic, functions of the air flow. It should be observed that the ordinates of the curves A and B, at any given air flow, are always greater than the ordinate of the straight line C.

In a Venturi type of measuring device, the pressure differential obtained between the throat of the venturi and the end of the venturi is always a non-parabolic function of the fluid flow, any particular ordinate of which is greater than the corresponding ordinate of the parabolic function which would be ideal for measuring purposes. In other words, it may be stated that a venturi is subject to an inherent error which causes the Venturi throat pressure to decrease more rapidly, or the pressure difference between entrance and throat to increase more rapidly, than the square of the velocity of the fluid flowing thru it. I have therefore provided means for obtaining a measuring pressure differential which is less than that existing between the throat and the end of the venturi, and which varies substantially as a parabolic function of the fluid flowing through the venturi.

In addition to the error due to the inherent non-parabolic characteristic of a venturi, it may be seen by comparing the curves A and B of Figure 4, that variations in the density of the fluid flowing through a Venturi meter cause the pressure differential between the throat and the end of the venturi to vary as a different non-parabolic function of the fluid flow for each different value of fluid density. I therefore provide in my flow measuring device means for compensating the action of the Venturi meter for variations in the density in the flowing fluid. In fact, I have provided an arrangement wherein a single valve is operated so as to compensate the action of the Venturi meter both for the inherent non-parabolic characteristic of the venturi, and for variations in the density of the fluid flowing through the venturi.

This compensating means includes the valve 23 and the bellows 30 which operates the valve 23 in accordance with the variations in absolute pressure at the throat of the venturi 14. Since the density of air is affected not only by its pressure but also by its temperature, the bellows 30 is preferably filled with nitrogen, or some other suitable fluid whose pressure varies with temperature, so that the valve 23 is also operated in accordance with the temperature of the air flowing thru the passage 11. It may be seen that the air flowing through the passage between the impact tube 17 and the throat of venturi 14 is subject to two restrictions in that passage, namely, the valve 23 and the fixed restriction 25. The total pressure differential between the end and the throat of the venturi is therefore separated in that passage into two component pressure differentials, one across the valve 23 and the other across the fixed restriction 25. It will be seen that as the valve 23 opens, a smaller proportion of the total pressure differential between the end and throat of the venturi exists across the valve, and a larger proportion occurs across the restriction 25. It may therefore be seen that the pressure differential across the valve 23 is less than the total pressure differential between the end and throat of the venturi by an amount depending upon the conformation of the valve 23 and the temperature and pressure to which the bellows 30 is subjected.

Since the bellows 30 is subjected to the pressure at the throat of the venturi 14, it may be seen that as long as the density of the fluid passing through the venturi is constant, the position of the valve 23 varies as a non-parabolic function of the air flow through the venturi 14. The effect of this variation in the position of valve 23 is to reduce the pressure drop across the valve as the air flow through the venturi increases. It therefore opposes the effect of the pressure differential between the throat and end of the venturi acting through the impact tubes 17, which is to increase the pressure differential across the valve 23 as the air flow through the venturi increases. I have found that by properly designing the conformation of valve 23, there may be obtained a pressure differential across the valve 23 which is substantially a true parabolic function of the air flow through the venturi 14.

Since the bellows 30 is filled with a fluid which varies in volume with the pressure to which the bellows is exposed, and since the bellows is exposed to a pressure of the fluid flowing through the venturi 14, it may be seen that variations in density in the flowing fluid will cause expansion and contraction in bellows 30 and operation of valve 23. By comparing curves A and B of Figure 4, it may be seen that a decrease in density of the fluid flowing through the Venturi meter causes an increase in the pressure differential in the venturi out of proportion to the desired parabolic relationship between the air flow and the pressure differential. This may be deduced from the fact that the curve A, in which the error is greater, was made with fluid of lower density than curve B.

As the density of the fluid passing through the venturi 14 decreases, the bellows 30 expands, thereby opening the valve 23 still wider, and decreasing the proportion of the total pressure drop which takes place across the valve 23. It may therefore be seen that the valve 23 exercises a correcting effect on the pressure drop across it, which compensates for the variations in that pressure drop caused by variations in the density of the air passing through the venturi 14.

To summarize the foregoing, it may be stated that while the pressure differential between the end and throat of the venturi is an exponential, non-parabolic function of the air flow thru the venturi, the valve 23 is operated so that the portion of the total pressure differential occurring across the valve 23 is substantially a true parabolic function of the mas of air flowing thru the passage 11.

In the carburetor illustrated in Figure 1, it is desired to proportion the fuel flowing through the carburetor 16 to the pressure drop existing across the valve 23, so that optimum combustion conditions may be obtained in the engine on which the carburetor is mounted.

The fuel supply for the carburetor in Figure 1 is obtained from a fuel pump or other source of fuel under pressure greater than atmospheric, and passes through a conduit 31, a fuel regulating valve unit generally indicated at 32, a pair of metering restrictions 63 and 64, a conduit 35, a pressure regulating valve unit 36, and a conduit 37 to the discharge nozzle 16.

The flow regulating valve unit 32 comprises a balanced valve member 33, supported by a flexible diaphragm 34, which is attached at its edges to the casing of the valve unit 32. The diaphragm 34 separates that casing into a pair of expansible chambers 65 and 66, which are connected by a conduit 67 including a restriction 38. A spring 39 is located in the chamber 66, and biases the valve 33 for movement toward open position.

A portion of the fuel entering the chamber 65 is bled through the restriction 38 to chamber 66, and thence passes thru a conduit 40 to a metering unit generally indicated at 41. The metering unit 41 comprises a casing 42 divided into four expansible chambers 43, 44, 45 and 46 by three flexible diaphragms 47, 48 and 50. A sleeve 51, carrying a valve member 52 at one end thereof, is supported and positioned by the three diaphragms 47, 48 and 50. The movements of sleeve 51 and the valve member 52 are guided by a post 53 extending through the center of the sleeve and having a tapered seat 54 formed thereon.

The conduit 40 is connected to the chamber 43, and the valve 52 and seat 54 control the passage of fuel from the chamber 43 through the center of the sleeve 51 to the chamber 46. The chamber 46 is connected through a conduit 55 to an inlet chamber 56 of the pressure regulating unit 36.

The pressure regulating unit 36 includes a balanced valve member 57, which is attached to and positioned by a flexible diaphragm 58, which is clamped at its edges in the casing of the regulator unit 36. A compression spring 60 biases the valve member 57 toward closed position. The diaphragm 58 divides the casing of the regulator unit 36 into two chambers 56 and 61. The chamber 61 is connected, through a conduit 62, to the vent ring 18.

The function of the pressure regulator unit 36 is to maintain a substantially constant pressure in the chamber 56 so that the flow of fuel through the metering restrictions 63 and 64 is not affected by changes in the pressure at the discharge nozzle 16 caused by variations in the position of throttle 15. In the regulator unit 36, the pressure in the chamber 56 is balanced by the force of the spring 60. The connection between chamber 61 and vent ring 18 is for purposes of venting the chamber only, so as to permit free movement of the diaphragm 58. The pressure in chamber 61 is so much smaller than the force of spring 18 and the force due to the pressure in chamber 56 that the pressure at the vent ring 18 has substantially no controlling effect on the position of the diaphragm.

The quantity of fuel flowing through the carburetor is determined by the position of valve 33 in the flow controlling unit 32. The position of valve 33 is in turn determined by the differential between the pressure in the chambers 65 and 66, and the force of the spring 39. Since the pressure on the downstream side of the jets 63 and 64 is maintained substantially constant by the regulator unit 36, and the force of spring 39 may also be considered as being constant, the pressure in the chamber 65 may be taken as a measure of the quantity of fuel flowing through the jets 63 and 64. In accordance with the laws of fluid flow, the pressure in chamber 65 is a parabolic function of the fluid flow through the restrictions 63 and 64. The pressure in chamber 65 is balanced against that in chamber 66, which is in turn controlled by the metering unit 41.

Chamber 45 of the metering unit 41 is connected through a conduit 70 and conduit 21 to the upstream side of valve 23. Chamber 44 of metering unit 41 is connected through a conduit 71 to the downstream side of valve 23. Therefore the pressure differential between the chambers 44 and 45 is a measure of the mass of air flowing through the passage 51. This pressure differential acts on the sleeve 51 in a direction to close the valve 52 against the seat 54. This closing tendency is resisted by the pressure in the chamber 43, which is the same as the pressure existing in chamber 66 of fuel regulating unit 32 and therefore is a measure of the quantity of fuel entering the carburetor. The pressure in chamber 46 is substantially constant, since it is connected to chamber 56, and therefore normally has no regulating effect on the position of valve 52. The connection of chamber 46 through passage 55 to chamber 56 also provides a convenient manner of disposing of the fuel passed through the valve 52.

It may therefore be seen that in the carburetor of Figure 1, a pressure which varies as a parabolic function of the fuel flow is balanced against a pressure differential which varies as a parabolic function of the air flow, and that the fuel flow is regulated in accordance with the difference between these two controlling forces.

*Figure 2*

There is shown in Figure 2 an arrangement by which the principles of my invention are applied to a rectangular carburetor of the type described and claimed in my co-pending application, Serial No. 406,776, filed August 14, 1941, now U. S. Patent No. 2,361,993, issued November 17, 1944. In this arrangement there is shown a carburetor body 100 through which extends an air passage 101 from an inlet 102 to an outlet 103. The body 100 is of rectangular cross section, and carries four parallel hollow Venturi members 104. A plurality of impact tubes 105 have their open ends projected into the path of air entering into the inlet 102. The impact tubes 105 form the entrance to a passage extending from the inlet 102 to the throat of the venturi formed by the members 104. This passage may be traced through the impact tubes 105, a vent ring 106, a conduit 107, a restriction 108, a conduit 110, past a valve 111 into a valve chamber 112, and thence through a conduit 113 to the interior of the two Venturi members 104 which are nearest the center of the passage 101. It should be noted that in this passage the fixed restriction and the variable restriction formed by the valve are reversed in position with respect to the corresponding restrictions in the device of Figure 1. In other words, the variable restriction is nearest the throat of the venturi, whereas the fixed restriction was nearest the Venturi throat in the construction of Figure 1. Furthermore, the pressure differential across the fixed restriction is connected to the metering unit by the conduits 70 and 71, which are connected to the metering unit in the same manner as the conduits 70 and 71 of Figure 1. This is in contrast to the use of the pressure differential across the variable restriction as the air metering pressure differential, which is illustrated in the device of Figure 1. It should be apparent, however, that the valve may be used to control the pressure differential across the fixed restriction in series with it, just as well as it can control the pressure differential across the valve itself.

The valve 111 is operated by a flexible bellows 114, whose right end is fixed to the carburetor body 100, and whose left end is attached to a movable plate 115 having a central projection which is adapted to engage the left end of the valve 111. A compression spring 116 maintains the valve 111 in engagement with the projection on the plate 115. A casing 117 surrounds the bellows 114. The casing and bellows together form a closed chamber 118, which may be filled with nitrogen or other suitable material whose volume changes in accordance with the variations of temperature and pressure adjacent the bellows 114. An extension 120 on the casing 117 extends through an opening 121 in the carburetor body 100 into the air passage 101. The temperature within the chamber 118 is thereby made to follow more closely variations in the temperature in the air flowing through the passage 101. Furthermore, the casing 117 is located in a chamber 122 in the carburetor body 100 which is connected through a conduit 123 through to interiors of the Venturi members 104 which lie adjacent the sides of the passage 101, and are not used as a part of the metering passage between the end and throat of the venturi. Another conduit 124 connects a point in the chamber 122 remote from the conduit 123 with the main air passage 101 at a point downstream from the throttles 125. The passage extending from the Venturi members 104 through the conduit 123 and conduits 121 and 124 to the main air passage 101 insure a constant flow of air around the outside of the casing 117, thereby providing for a more sensitive action of the bellows 114 in response to changes in the temperature of the air flowing through the passage 101.

Figure 3

There is shown in Figure 3 a modification of the carburetor illustrated in Figure 1 in which the fixed and variable restrictions in the passage connecting the end and throat of the venturi are arranged in the manner shown in Figure 2.

In Figure 3, the passage between the inlet and throat of the venturi may be traced thru an impact tube 130, a vent ring 131, a conduit 132, a chamber 133 of a metering unit 134 which is substantially the same as the metering unit 41 of Figure 1, a conduit 135, a restriction 136, a chamber 137 in the metering unit 134, a conduit 138, past a valve 140 and through a chamber 141 and a conduit 142 to the throat of the venturi. The valve 140 is operated by a flexible bellows 143.

It will be seen that in this arrangement, the pressure differential measured by the metering unit 134 is that established across restriction 136, and this pressure differential is controlled by the valve 140 in the same manner as described in connection with Figure 1.

From a comparison of Figures 1 and 2, it should be apparent that the particular sequence in which the fixed and variable restrictions are arranged in the passage connecting the end and throat of the venturi is of no particular importance as far as the operation of my improved fluid flow measuring means is concerned. Furthermore, it is possible to utilize either the pressure differential across the fixed restriction or the drop across the variable restriction as the flow metering pressure differential. Of course, the valve operation when the drop across the fixed restriction is used as the metering pressure differential must be opposite to the valve operation when the drop across the variable restriction is used as the metering pressure differential. In other words, the valve must close in response to a decrease in pressure at the Venturi throat when the drop across the fixed restriction is used as the metering pressure differential (as in Figure 2), and the valve must open in response to a decrease in pressure at the Venturi throat when the drop across the variable restriction is used as the metering pressure differential.

While I have shown and described certain preferred embodiments of my invention, other modifications thereof will occur to those skilled in the art and I therefore intend that my invention shall be limited only by the appended claims.

I claim as my invention:

1. A carburetor for an internal combustion engine, comprising in combination, a conduit of rectangular cross-section for air flowing thru said carburetor, Venturi means in said conduit comprising a plurality of spaced parallel hollow Venturi members having apertures connecting their interiors to the throat of said Venturi means, a first passage connecting the interiors of certain of said members to a point in said conduit spaced from said Venturi means, a valve in said passage, thermostatic means for operating said valve to vary the air flow thru said passage in accordance with the temperature of the air in said conduit, a second passage connecting the interiors of certain others of said members to a point in said conduit spaced from said Venturi means, said thermostatic means being located in said second passage so as to be exposed to the air flowing therethru, and means responsive to the difference in the pressures at spaced points in said first passage for controlling the flow of fuel thru said carburetor.

2. Apparatus for measuring the flow of a fluid of variable density, comprising a conduit for said fluid, a Venturi structure in said conduit, a pair of independent passages connecting the throat of said venturi to points in said conduit spaced from said throat, a pair of restrictions in series in one of said passages, a valve for varying the area of one of said restrictions, means for operating said valve including a sealed expansible chamber having a fixed wall and a resiliently movable wall and filled with a fluid having an appreciable coefficient of thermal expansion, a second chamber located on the opposite side of said fixed wall from said movable wall and connected in the other of said passages to be ventilated by the air flowing therethru, said other passage being unrestricted so that the air flowing thru it is at substantially the same temperature as the air in said conduit and is substantially unaffected by the temperature of the passage walls, a third chamber located on the opposite side of said movable wall from said fixed wall and connected in said one passage between said restrictions and said throat, said chambers cooperating so that the positions of said movable wall and valve are affected by the temperature in said second chamber and the pressure in said third chamber, and means for measuring the pressure differential set up in said one passage by one of said restrictions.

3. A carburetor for an internal combustion engine, comprising a body having a conduit extending therethru for combustion air flowing to said engine, a venturi in said conduit, a pair of independent passages connecting the throat of said venturi to points in said conduit spaced from said throat, a pair of restrictions in series in one of said passages, a valve for varying the area of one of said restrictions, means for operating said valve including a sealed expansible chamber having a fixed wall and a resiliently movable wall and filled with a fluid having an appreciable coefficient of thermal expansion, a second chamber located on the opposite side of said fixed wall from said movable wall and connected in the other of said passages to be ventilated by the air flowing therethru, said other passage being unrestricted so that the air flowing thru it is at substantially the same temperature as the air in said conduit and is substantially unaffected by the heat from said engine communicated thru the passage walls, a third chamber located on the opposite side of said movable wall from said fixed wall and connected in said one passage between said restrictions and said throat, said chambers cooperating so that the positions of said movable wall and valve are affected by the temperature in said second chamber and the pressure in said third chamber, and means responsive to the pressure differential set up in said one passage by one of said restrictions for controlling the flow of fuel to said engine.

4. Apparatus for measuring the flow of a fluid of variable density, comprising a conduit for said fluid, a Venturi structure in said conduit, a generally cylindrical chamber having a peripheral interior shoulder, a cup-shaped casing mounted in said chamber with its rim engaging said shoulder so as to separate said chamber into two compartments, each said compartment having a pair of spaced ports opening therein, unrestricted passage means connecting the respective ports in the one of said compartments outside said casing to the throat of said venturi and to a point in said conduit spaced from said throat to ventilate said one compartment with air at substantially the same temperature as the air in said main conduit, a flexible bellows mounted concentrically within said casing and having one end fixed to the open end of said casing, a wall closing the free end of said bellows and forming with said bellows and casing an expansible chamber, a fluid having an appreciable coefficient of thermal expansion in said expansible chamber, a valve having a stem aligned with said wall, said valve cooperating with one of the ports in the other of said compartments, spring means biasing said valve stem into engagement with said wall so that it moves concurrently therewith, second passage means including a first section connecting the other port in said other compartment to the throat of said venturi and a second section connecting said one port in said other compartment to a point in said main conduit spaced from said throat, said valve forming a restriction in said second section, another restriction in series in said second section, and means for measuring the pressure differential set up by one of said restrictions.

MILTON E. CHANDLER.